March 30, 1926.                                              1,578,501
L. DORFMAN
ELECTRICAL MEASURING INSTRUMENT
Filed Dec. 7, 1920
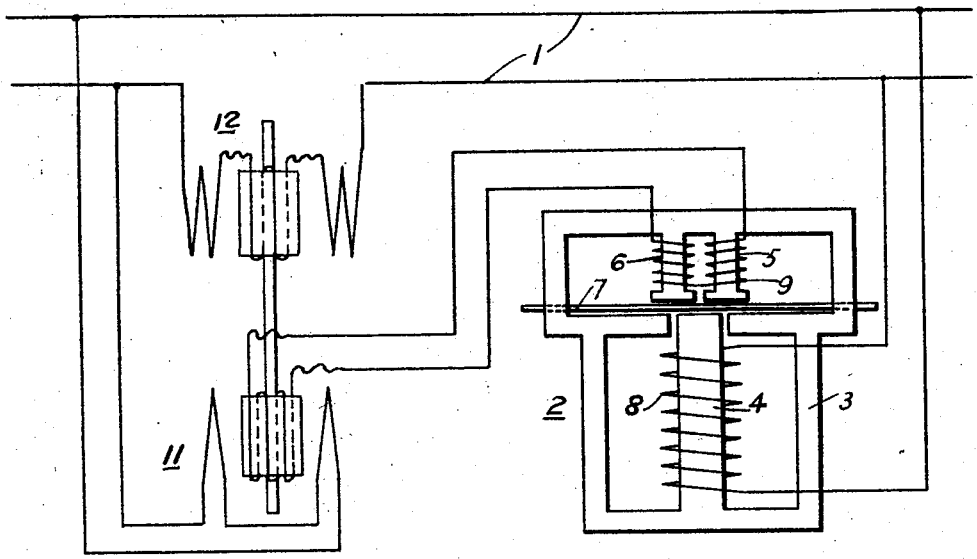
WITNESSES:
INVENTOR
Leo Dorfman
BY
ATTORNEY Patented Mar. 30, 1926.

1,578,501

UNITED STATES PATENT OFFICE.

LEO DORFMAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed December 7, 1920. Serial No. 428,877.

*To all whom it may concern:*

Be it known that I, LEO DORFMAN, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and it has special relation to volt-ampere-hour meters.

One object of my invention is to provide an instrument of the above-indicated character which shall be simple and economical to construct and efficient and reliable in operation.

Another object of my invention is to provide a meter which, under ordinary operation and connection, is adapted to register watt hours, with inductive means whereby the meter will register volt-ampere hours.

The present invention contemplates connecting the potential winding of an ordinary induction-type watt-hour meter to the circuit, the volt amperes of which are to be measured, and interposing, between the current winding thereof and the circuit, an induction regulator which is adapted to be deflected in accordance with the current in the circuit so that the current which traverses the current winding of said meter shall be proportional to the current traversing the circuit and shall have a predetermined phase relationship to the current traversing the potential winding, irrespective of the power factor of the circuit.

In the accompanying drawing, the single figure is a diagrammatic illustration of the circuits and apparatus embodying my invention.

An alternating-current electric circuit 1 has a meter 2 connected thereto. The meter 2 is of the usual construction of a watt-hour meter and comprises a magnetizable core 3, having pole pieces 4, 5 and 6, and an armature 7 located between certain of the said pole pieces. The pole piece 4 has a potential winding 8 thereon, and the pole pieces 5 and 6 have windings 9 thereon. The potential winding 8 is connected directly across the electric circuit 1. The winding 9 is electrically connected to one winding of an induction regulator 11, the other winding of which is directly connected across the electric circuit 1. The induction regulator 11 is mechanically connected to a small alternating-current torque motor 12, which is connected in series with the electric circuit 1, and is adapted to be deflected in accordance with the varying currents therein.

By reason of the operative connections between the motor 12 and the regulator 11, the regulator 11 will be deflected in accordance with the current in the electric circuit 1. Hence, the secondary voltage of the induction regulator will be proportional to the current in the circuit, but, by reason of the shunt connection of the primary winding to the circuit, this voltage will be in fixed-phase relation to the voltage of the circuit, or at a definite fixed angle thereto. Consequently, the current winding of the meter 2 will be traversed by a current which is, at all times, proportional to the current traversing the electric circuit 1 at a fixed phase position with reference to the voltage. Hence, the meter armature will be operated in proportion to the direct product of the voltage and the current in the electric circuit 1 or in accordance with the volt amperes.

I do not wish to be limited to the structure and apparatus herein set forth, as numerous modifications thereof may be made within the spirit and scope of my invention. I desire, therefore, that only such limitations shall be imposed as are included in the appended claims.

I claim as my invention:—

1. A volt-ampere meter for an alternating-current circuit comprising a movable indicating member, meter windings for actuating the same, one of which is energized in accordance with one of the factors of the apparent energy of the circuit, an induction regulator having a primary winding connected to the circuit and a secondary winding connected to the other meter winding, and a torque motor device responsive to only one quantity of the circuit for actuating said regulator.

2. A volt-ampere meter for an alternating-current circuit comprising a movable member, windings responsive to two fixed-phase elements derived from the circuit, one of said elements being responsive to one of the factors of the apparent energy of the circuit, and means for effecting an inductively derived current in the other winding in accordance with the other factor of the apparent energy of the circuit.

3. A volt-ampere meter for an alternating-current circuit comprising a movable indicating member, windings for actuating the same, one of said windings being energized in accordance with one of the factors of the apparent energy of the circuit, an induction regulator having a primary winding connected to the circuit and a secondary winding connected to the other meter winding and means for actuating said regulator in accordance with one factor of the apparent energy of the circuit.

4. In a volt-ampere meter for an alternating-current circuit, the combination with a movable member and actuating windings therefor, one of which is directly connected to the circuit to be energized in accordance with one of the factors of the apparent energy of the circuit, of means for energizing the other winding in accordance with the other factor of the apparent energy of the circuit, said means comprising a torque motor having series-related stationary and movable elements connected to the circuit, and an induction regulator actuated by said motor, said motor comprising a movable element connected in circuit with said other winding and a stationary element connected to the circuit.

5. In a volt-ampere meter for an alternating-current circuit, the combination with a movable member and actuating windings therefor, one of which is connected across the circuit, of means for varying the current of the other winding in accordance with the current of the circuit, said means comprising an induction regulator having a primary winding connected across the circuit and a secondary winding connected in series relation to said other meter winding, and a torque motor device for actuating said regulator, said motor comprising stationary and movable windings connected in series relation to each other and to said circuit.

In testimony whereof, I have hereunto subscribed my name this 30th day of November 1920.

LEO DORFMAN.